United States Patent [19]

Karlsson

[11] 4,328,870
[45] May 11, 1982

[54] PLOUGH FOR WORKING OF SOIL

[76] Inventor: Rune Karlsson, Blacksta Pl. 5133, Nyköping, Sweden, S-611 00

[21] Appl. No.: 92,834

[22] Filed: Nov. 9, 1979

[30] Foreign Application Priority Data

Nov. 27, 1978 [SE] Sweden .................................. 7812180

[51] Int. Cl.³ .............................................. A01B 15/02
[52] U.S. Cl. ..................................... 172/657; 172/760
[58] Field of Search ............... 172/760, 754, 697, 657, 172/696, 770, 759

[56] References Cited

U.S. PATENT DOCUMENTS

| | | | |
|---|---|---|---|
| 1,006,458 | 10/1911 | Beange | 172/760 |
| 1,023,771 | 4/1912 | Stone | 172/756 |
| 1,139,840 | 5/1915 | Boyer | 172/760 |
| 1,528,863 | 3/1925 | Walker | 172/754 |
| 2,125,036 | 7/1938 | Stewart | 172/760 |
| 3,063,506 | 11/1962 | Bertelsen | 172/760 X |
| 3,543,861 | 12/1970 | Takakita | 172/754 X |

Primary Examiner—Richard J. Johnson
Attorney, Agent, or Firm—Sherman & Shalloway

[57] ABSTRACT

This invention provides a new method of ploughing in which the cut ridge is inverted in its own furrow. The plough for doing this consists of at least two upright main bodies (4) parallelly spaced and elongated in the ploughing direction. At the front portion the respective main body is provided with a ploughshare (6) extending in the horizontal plane. A mouldboard (7) designed in known manner extends from the rear edge of the share on the side of the one main body facing the second main body, while a second mouldboard (8) is arranged on the other main body on the side thereof facing the first main body. The second mouldboard (8) turns from an upright position connecting to the front portion of the main body (4) to a position where the lower edge of the mouldboard diverges from the main body at an even level while the upper edge of the plate (8) approaches that level.

6 Claims, 4 Drawing Figures

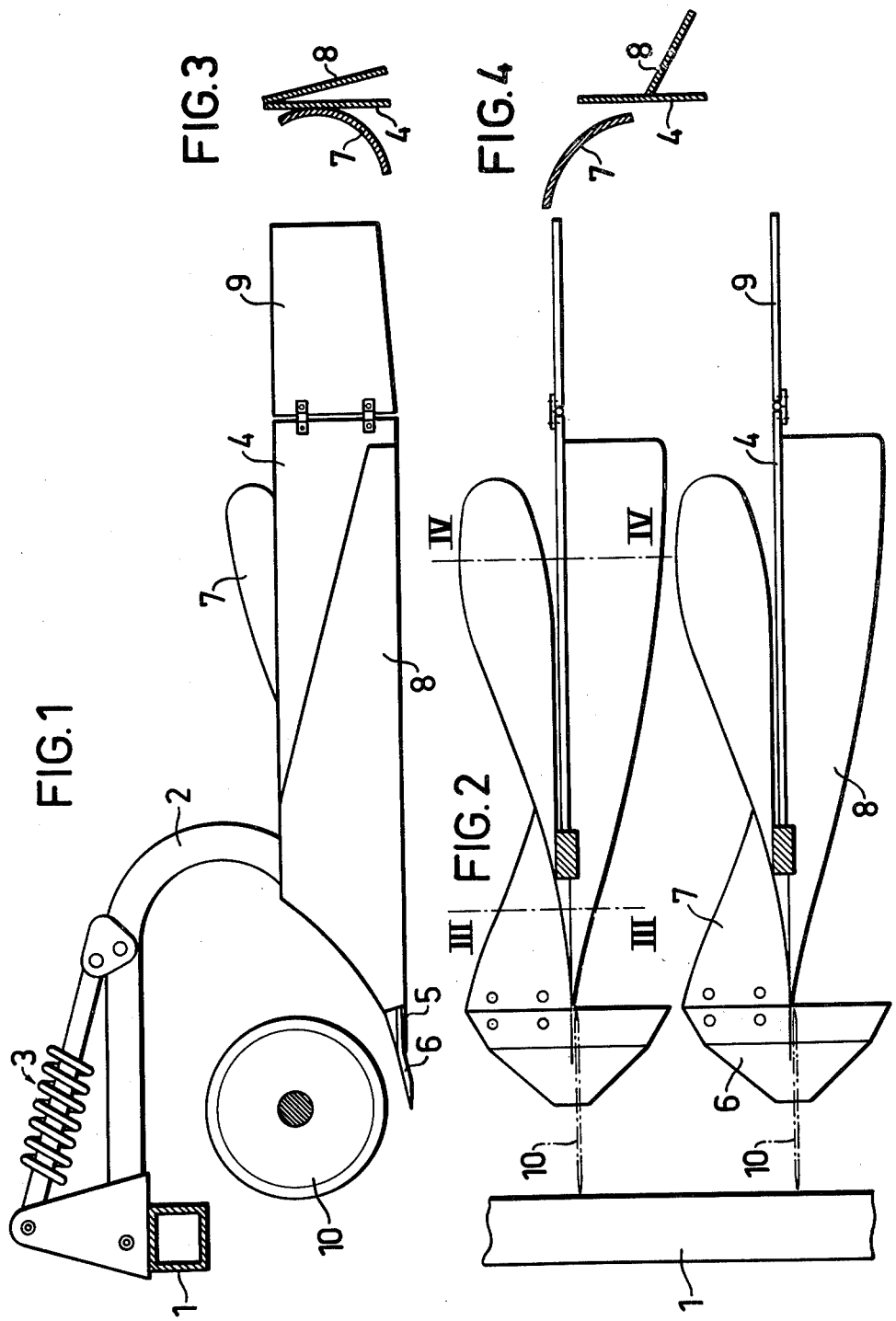

PLOUGH FOR WORKING OF SOIL

This invention relates to a plough for working of soil. Ploughs have been used for a very long time in agriculture. From the beginning the plough was an instrument leaving a furrow behind and pushing the earth to the sides without considering that the earth due to the construction of the implement was inverted. This instrument is today called a primitive wooden plough and is, for example, used for planting potatoes. Much later ploughs were developed merely for inverting the earth. Such a plough cuts and shapes, by its construction, a ridge which is handled by a helical mouldboard and is deposited either to the right or to the left. Also this plough leaves a furrow behind, but as distinguished from the primitive wooden plough, a furrow with straight angled sides and bottom.

From the simple plough drawn by horses development has gone towards multiple ploughs drawn by tractors, which ploughs for operation and transport are completely lifted and carried by the tractor via its hydraulic system. In spite of the fact that the aim is to be able to draw ever more ploughs at the same time, a restriction of the number of ploughs is rapidly reached, not due to an insufficient tractor power or too large a tool weight but due to the weight of the tool relative to the centre of gravity of the tractor. The more plough units to be coupled to the implement the further backwards the total centre of gravity of the equipment is moved.

When ploughing with the usual plough putting the earth aside the problem will always arise to turn the earth backwards in a direction opposite to the earlier ploughing occasion. Otherwise a certain part of the field will have an excess of humus while other parts of the field will get too small a portion of humus. To eliminate this problem a type of plough has been constructed which carries in its frame a series of ploughelements turning the earth to the right and a series of ploughelements turning it to the left. When the "right-turning" ploughs work in the earth the "left-turning" ploughs are swung upwards in an upside down position while the "right-turning" ploughs enter the same position when the "left-turning" ploughs are operating. This type of plough is called reversible plough and makes possible ploughing from one side of the field to the other without leaving ridges and final furrows behind as before. The problem with this type of plough remains that the earth is still ploughed to one side of the field or the other. In spite of the fact that this implement will be very heavy and the operating number of ploughs will consequently be restricted, it is, however, the best that is recommended today.

Another disadvantage of the ploughs now known and used is that a lateral pressure will arise at turning of the ridges in the same direction which pressure is taken up by the land side of the plough. When ploughing stiff clay soils this pressure will be considerable. Thus, great lateral forces will act on tractor and implement when ploughing with multiple ploughs.

The disadvantages associated with the previously known ploughs have been eliminated by means of the present invention the characteristic features of which are set out in the following claims.

The ridge is completely turned and, in this way, put back to its own furrow. Smooth and flat fields are maintained after working. It is also possible thanks to the invention still to utilize the ability of the pressure rod to load the tractive wheels of the tractor correctly by the side-by-side arrangement of multiple-plough implements. This makes it possible, in combination with the limitation of the lateral pressure, to carry several plough units in the same implement, which means, in its turn, that the normal working width at ploughing can be considerably increased with maintained tractor power.

The invention will be described more specifically in the form of an example with reference to the drawing, wherein:

FIG. 1 is a lateral view of a plough of the invention;
FIG. 2 is a top view of the plough;
FIG. 3 is a section along the line III-III in FIG. 2; and,
FIG. 4 is a section along the line IV-IV in FIG. 2.

DETAILED DESCRIPTION OF THE PREFERRED EMBODIMENTS

The implement according to the invention comprises a supporting beam 1, which is intended to be supported e.g. by the implement coupling of the tractor, transverse to the direction of travel. The length of the supporting beam 1 is defined by how many plough elements in width are to be supported by the beam. A desired number of plough elements are located beside each other at the supporting beam 1 by means of plough beam 2 associated with the plough dements.

Each plough element consists of an elongated, main body 4 made of flat or curved plate material, which is placed on edge, i.e. vertically to the ground surface. In the front part a share 6 is fastened to the main body 4 by means of an attachment 5 (schematically indicated in the drawing). The share 6 is arranged substantially horizontally and has a substantially lateral extension, as is apparent from FIG. 2. A mouldboard 7 of a conventional type in principle is arranged on the right side of the main body 4 (FIG. 2). This mouldboard 7 connects to the share 6 at the rear edge thereof and is fastened to the attachment 5 e.g. by bolts or rivets. A second mouldboard 8 is arranged on the left side (FIG. 2) of the main body 4 (FIG. 2). This mouldboard has a special form. From being vertically connected and fastened to the main body 4 it is turned so that its lower edge is diverging from the body 4 while its upper edge is lowered from the upper edge of the main body 4 under continued connection to the main body. Thus, the second mouldboard 8 is turned from a vertical position at the front end of the main body 4 to a substantially less inclined position, of. FIGS. 3 and 4. The lower edge of the mouldboard extends substantially on a level with the lower edge of the main body 4.

A colter 10 is arranged in front of the plough element and above the share 6 in the usual way. The colter 10 shown has the shape of a disc. An automatic stone release 3 is also indicated schematically in FIG. 1. This is no part of the invention and is therefore not dealt with in detail.

The function of the plough according to the invention is as follows: At the movement of the plough the colter 10 cuts a vertical section in the soil in front of each plough element. The shares 6 cut horizontal sections, two parts of the shares of adjacent plough elements facing each other cutting an approx. coherent section. The colters 10 and the shares 6 have now cut a ridge of a rectangular section. This ridge between two adjacent plough elements will be lifted at its left edge by the mouldboard 7, (see FIG. 2), will be successively placed on edge and tilted onto its back. Meanwhile the mouldboard 8 will due to its construction support this tilting movement and, moreover, successively displace the edge of the ridge facing the ground towards the other plough element. When the ridge leaves the plough between the two plough elements the ridge has been inverted "in place", i.e. the ridge is still in the ploughed furrow.

For extremely difficult ploughing conditions the main body can be provided with an extension 9. This is articulatedly connected to the body 4 and controls, when necessary, the inverted ridge in the cut furrow, which is simplified by the vibrations and oscillations of the extensions 9.

The outermost plough elements of the plough are formed merely with one mouldboard with its associated share. The outermost left plough element in a plough built according to FIG. 2 is thus lacking the mouldboard 8 with its associated half portion of the ploughshare 6 the outermost right element is lacking the moulboard 7 and the associated half portion of the ploughshare.

The distances of the plough beams 2 from each other are adjustable within the scope of the invention along the supporting beam 1, the width of the ridge in this way being variable. The width of the share 6 can also be varied and it is possible to make the mouldboards adjustable, e.g. in a conventional way by means of suitably arranged rigging screws.

The plough shown in the drawing turns the ridge clockwise, but the mouldboards can of course be arranged so that the ridge is turned anti-clockwise instead.

I claim:

1. Plough for working of soil at the surface of the ground by cutting slices or the soil and inverting the soil to be redeposited into the same furrow characterized in that:
  (a) it consists of at least two parallely spaced, upright, planar main bodies (4), each main body supporting at its front as seen in the direction of travel a substantially horizontal ploughshare (6), each main body facing an adjacent main body;
  (b) in that one of said main bodies on a side facing another main body is provided with a first mouldboard (7) having a horizontal width which is less than the spacing between said main bodies, the first mouldboard projecting from the rear of the ploughshare and the other main body being provided with a second mouldboard (8) separate from the first mouldboard so that the ground is exposed between the firstand second mouldboards, the second mouldboard being on the side facing first main body, which second mouldboard is constructed to turn substantially continuously from an upright position connecting to the front portion of the main body so that its lower edge is diverging from the main body at a substantially maintained level and spaced from the opposing main body while its upper edge approaches said level, which level substantially corresponds to the level of the ploughshare; and
  (c) in that several main bodies are arranged with the first and second mouldboards of adjacent main bodies (4) in an opposed relationship beside each other the number of main bodies depending on a number of furrows to be turned.

2. The plough of claim 1, characterized in that the upper edge of the second mouldboard (8) is located at the main body.

3. The plough of any one of claims 1 or 2, characterized in that the second mouldboard (8) is longer than the first mouldboard (7).

4. The plough of any one of claims 1 or 2, characterized in that the main body (4) is provided with an extension (9) articulated in the horizontal plane at the rear edge of the main body (4).

5. The plough of claims 1 or 2 characterized in that the second mouldboard (8) is longer than the first mouldboard (7), the main bodies (4) are arranged beside each other along a line perpendicular to the direction of travel, and each of the main bodies (4) is supported by a plough beam (2) which is movably attached to a supporting beam (1) extending transversely to the direction of travel and intended to be adapted to the implement coupling of a tractor.

6. Plough for working of soil, characterized in that:
  (a) it consists of at least two parallelly spaced, upright, planar main bodies (4), each main body supporting at its front as seen in the direction of travel a substantially horizontal ploughshare (6), each main body facing the adjacent main body;
  (b) in that one of said main bodies on a side facing another main body is provided with a first mouldboard (7) projecting from the rear of the ploughshare and designed to invert a furrow slice, the other main body being provided with a second mouldboard (8) on the side facing the first main body, which mouldboard is constructed to turn substantially continuously from an upright position connecting to the front portion of the main body so that its lower edge is diverging from the main body at a substantially maintained level while its upper edge approaches said level, which level substantially corresponds to the level of the ploughshare;
  (c) in that several main bodies are arranged with the first and second mouldboards of adjacent main bodies (4) in an opposed relationship beside each other the number of main bodies depending on a number of furrows to be turned; and
  (d) in that the main bodies (4) are arranged beside each other along a line perpendicular to the direction of travel and are each supported by plough beam (2) which is movably attached to a supporting beam (1) extending transversly to the direction of travel and intended to be adapted to the implement coupling of a tractor.

* * * * *